US009169973B2

United States Patent
Nickel

(10) Patent No.: US 9,169,973 B2
(45) Date of Patent: Oct. 27, 2015

(54) ZONAL OPERATOR PRESENCE DETECTION

(71) Applicant: AGCO Corporation, Duluth, GA (US)

(72) Inventor: Vincent Nickel, Peabody, KS (US)

(73) Assignee: AGCO Corporation, Duluth, GA (US)

( * ) Notice: Subject to any disclaimer, the term of this patent is extended or adjusted under 35 U.S.C. 154(b) by 9 days.

(21) Appl. No.: 14/109,167

(22) Filed: Dec. 17, 2013

(65) Prior Publication Data
US 2014/0172248 A1    Jun. 19, 2014

Related U.S. Application Data
(60) Provisional application No. 61/738,640, filed on Dec. 18, 2012.

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *F16P 3/14* | (2006.01) |
| *A01B 79/00* | (2006.01) |

(52) U.S. Cl.
CPC . *F16P 3/147* (2013.01); *F16P 3/14* (2013.01); *F16P 3/142* (2013.01); *A01B 79/005* (2013.01)

(58) Field of Classification Search
CPC .... A01B 79/005; A01B 69/008; A01B 76/00; F16P 3/142; F16P 3/14; F16P 3/147; G06F 17/30; G06F 7/00; G06F 17/40; G06F 1/26; G06F 1/32; G06F 7/76

USPC ............ 701/50, 25, 51, 93, 517, 472, 470, 1, 701/36; 180/170, 330, 271, 329, 324
See application file for complete search history.

(56) References Cited

U.S. PATENT DOCUMENTS

| | | | |
|---|---|---|---|
| 6,744,372 B1* | 6/2004 | Shaw et al. .................... | 340/685 |
| 7,890,766 B2* | 2/2011 | Girouard et al. .............. | 713/182 |
| 7,916,898 B2* | 3/2011 | Anderson ..................... | 382/104 |
| 7,953,526 B2* | 5/2011 | Durkos et al. ................. | 701/25 |
| 8,280,595 B2* | 10/2012 | Foster et al. .................... | 701/50 |
| 8,738,238 B2* | 5/2014 | Rekow ............................ | 701/50 |
| 2002/0104013 A1* | 8/2002 | Ghazarian ..................... | 713/200 |
| 2002/0175824 A1* | 11/2002 | Shaw ............................. | 340/685 |
| 2003/0145571 A1* | 8/2003 | Diekhans .................. | 56/10.2 R |
| 2004/0136139 A1* | 7/2004 | Kummel ....................... | 361/226 |
| 2005/0088643 A1* | 4/2005 | Anderson ..................... | 356/5.01 |
| 2006/0271263 A1* | 11/2006 | Self et al. ........................ | 701/50 |
| 2009/0228166 A1* | 9/2009 | Durkos et al. .................. | 701/26 |
| 2010/0070145 A1* | 3/2010 | Foster et al. .................... | 701/50 |
| 2010/0145551 A1* | 6/2010 | Pulskamp et al. ................ | 701/2 |
| 2012/0237083 A1* | 9/2012 | Lange et al. .................. | 382/103 |
| 2013/0169785 A1* | 7/2013 | Matthews ....................... | 348/77 |
| 2013/0197767 A1* | 8/2013 | Lenz ............................... | 701/50 |

* cited by examiner

*Primary Examiner* — Calvin Cheung
*Assistant Examiner* — Luis A Martinez Borrero

(57) ABSTRACT

A method for detecting zonal operator presence includes receiving a sensor output from a sensor. The sensor may be located on an agricultural machine and the sensor output indicates an operating state of the agricultural machine. Once the sensor output has been received, the operating state of the agricultural machine is determined based on the sensor output. The operating state includes an operator being located within a work area of the agricultural machine. The work area is divided into a plurality of zones. An operating parameter is adjusted based on the operating state.

16 Claims, 4 Drawing Sheets

ZONAL OPERATOR PRESENCE DETECTION

CROSS REFERENCE TO RELATED APPLICATION

This application claims the benefit of U.S. Provisional Application No. 61/738,640, entitled ZONAL OPERATOR PRESENCE DETECTION filed Dec. 18, 2012, which is hereby incorporated by reference in its entirety.

BACKGROUND OF THE INVENTION

1. Field of Invention

This invention relates to operation of an agricultural machine, and more particularly to using a zonal operator presence detector to determine if an operator is located within a work area of the agricultural machine.

2. Description of Related Art

Various vehicles and implements are used within an agricultural environment. The vehicles and implements may include various areas an operator or plurality of operators may be located. In addition, the vehicles and implements may include guidance systems to assist an operator in reaching a desired location and/or following a desired path.

OVERVIEW OF THE INVENTION

In one embodiment, the invention is directed to a method for detecting zonal operator presence. First, a sensor output may be received from a sensor. The sensor may be located on an agricultural machine. The sensor output may be configured to indicate an operating state of the agricultural machine. Once the sensor output has been received, the operating state of the agricultural machine may be determined based on the sensor output. The operating state may include an operator being located within a work area of the agricultural machine. The work area may be divided into a plurality of zones. An operating parameter may be adjusted based on the operating state.

Another embodiment may comprise a memory and a processor operatively connected to the memory for detecting zonal operator presence. The processor may be operative to receive a sensor output. Once the sensor output has been received, the processor may determine the operating state of the agricultural machine based on the sensor output. The agricultural machine may comprise an operating parameter and a work area divided into zones. The processor may be operative to alter an operating parameter based on the operating state.

Yet another embodiment may comprise an agricultural machine, a plurality of sensors, and a processor coupled to a memory for detecting zonal operator presence. The plurality of sensors may be attached to the agricultural machine at various positions. The agricultural machine may also comprise an operator area divided into a plurality of zones. Each zone may comprise at least one of the plurality of sensors arranged to detect a position of an operator when the operator is located within at least one of the plurality of zones. The processor may be operative to: receive a sensor output from the plurality of sensors, determine an operating state of the agricultural machine based on the sensor output, and adjust an operating parameter of the agricultural machine based on the operating state.

Zonal operator presence may be provided. First a sensor output may be received from a sensor. The sensor may be located on an agricultural machine. The sensor output may be configured to indicate an operating state of the agricultural machine. Once the sensor output has been received, the operating state of the agricultural machine may be determined based on the sensor output. The operating state may include an operator being located within a work area of the agricultural machine. The work area may be divided into a plurality of zones. An operating parameter may be adjusted based on the operating state.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

An agricultural machine (e.g., a tractor, a combine, a sprayer, etc.) may or may not have implements (e.g., trailers, plows, etc.) attached to it. The agricultural machine and implement may have a work area that may be divided into zones. For example, an area immediately surrounding a tractor may be the work area and the area in front of, behind, and to each side may each be a zone. In addition, the tractor's cab may be a work area and it may be divided into zones. For instance, an area around the driver's seat may be one zone and an area around the steering wheel may be another zone.

The agricultural machine may comprise different operating states. Each of the operating states may comprise the agricultural machines operating parameters having certain values. Sensors located throughout the agricultural machine may determine the agricultural machine's operating state. The sensors may include, for example, seat switches, door switches, cameras, and motion detectors.

Depending on where an operator, or parts of the operator, may be located within the work area, the operating state of the agricultural machine may be modified by adjusting the operating parameters. For example, the agricultural machine may comprise an auto guidance system that may automatically steer and propel it along a predefined path (e.g., a wayline). An operating state may be that the auto guidance system is engaged with the operator seated behind the steering wheel. A second operating state may be that the auto guidance system is engaged with the operator standing behind the steering wheel. Based on the operating state, an operating parameter may be modified. For instance, if the operator is standing, the maximum speed of the tractor may be reduced. If the operator sits down, the maximum speed of the tractor may be increased.

Figure 1:
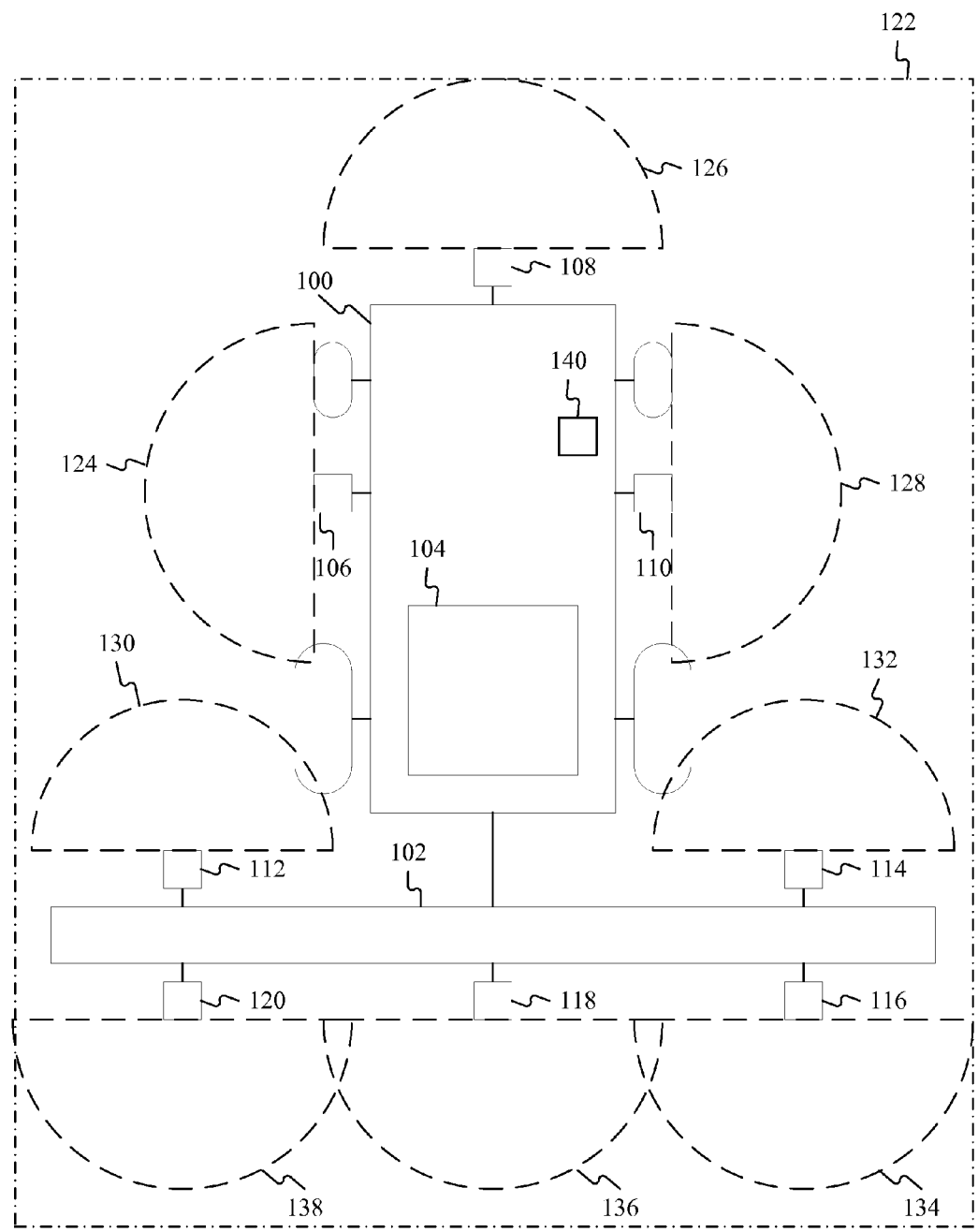
FIG. 1 is a diagram of tractor and implement.

FIG. 1 is a block diagram of a tractor 100 and an implement 102. Tractor 100 may comprise a cab 104. Tractor 100 may comprise a first sensor 106, a second sensor 108, and a third sensor 110. Implement 102 may comprise a fourth sensor 112, the fifth sensor 114, a sixth sensor 116, a seventh sensor 118, and an eighth sensor 120. Tractor 100 and implement 102 may be located in a work area 122. Work area 122 may be divided into zones monitored by the sensors. For example, first sensor 106 may monitor a first zone 124, second sensor 108 may monitor a second zone 126, third sensor 110 may monitor a third zone 128, fourth sensor 112 may monitor a fourth zone 130, fifth sensor 114 may monitor a fifth zone 132, sixth sensor 116 may monitor a sixth zone 134, seventh sensor 118 may monitor a seventh zone 136, and eighth sensor 120 may monitor an eighth zone 138.

Examples of sensors include, but not limited to, motion sensors, cameras, LIDAR systems, infrared sensors, and thermal sensors. Each sensor location may include multiple sensors. For example, sixth sensor 116, seventh sensor 118, and eighth sensor 120 may include motion sensors and infrared sensors. Second sensor 108 may include only a thermal sensor. For example, if tractor 100 is operating in a corn field, a motion sensor monitoring second zone 126 may be ineffective because it may detect the movement of the corn as tractor 100 runs over it. However, a thermal sensor monitoring second zone 126 may detect the difference in temperature of the corn and an animal that may be hidden by the corn. The difference in temperature may be utilized to alert the operator to the presence of a living thing.

Tractor 100 may comprise a zonal detection processor 140 (described in greater detail below with respect to FIG. 3) that may control tractor 100's and/or implement 102's operating parameters. Each sensor may provide a sensor output that may be received by zonal detection processor 140. As described below with respect to FIG. 4, based on the sensor output received, zonal detection processor 140 may adjust one or more of tractor 100's and/or implement 102's operating parameters.

Figure 2A:
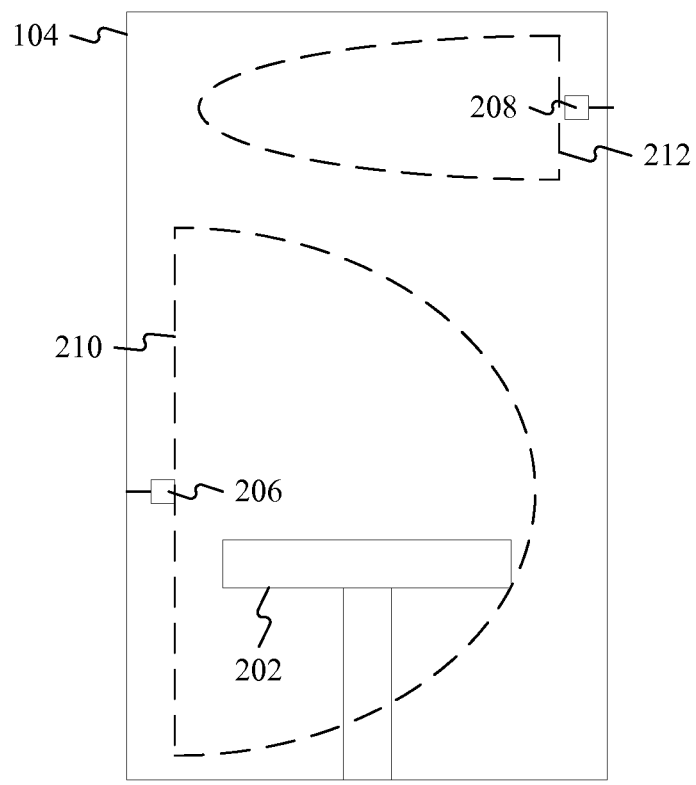
FIGS. 2A and 2B are diagrams of a cab.
Figure 2B:
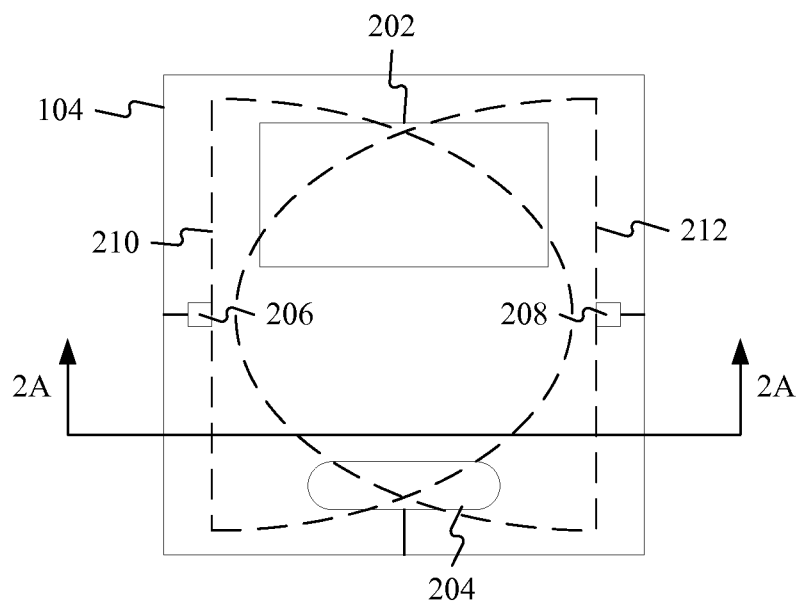

FIGS. 2A and 2B are diagrams of cab 104. Cab 104 may include a seat 202 and a steering wheel 204. A ninth sensor 206 and a tenth sensor 208 may be located within cab 104. As shown in FIG. 2A, ninth sensor 206 may be located at a different height within cab 104 than tenth sensor 208. Cab 104 may be a work area and it may be divided into zones. For example, ninth sensor 206 may monitor a ninth zone 210 (e.g., a lower portion of cab 104) and tenth sensor 208 may monitor a tenth zone 212 (e.g., an upper portion of cab 104).

Having sensors at various heights may allow for detecting when an operator is seated or standing. For example, when ninth sensor 206 detects the operator's presence, zonal detection processor 140 may not be able to determine if the operator is seated or standing. However, when tenth sensor 208 detects the operator's presence, zonal detection processor 140 may determine that the operator is standing.

Examples of sensors include, motion sensors, cameras, LIDAR systems, infrared sensors, thermal sensors, and contact sensors (e.g., door, window, and seat switches). Each sensor location may include multiple sensors. For example, eighth zone 210 may be monitored by eighth sensor 206, which may be a motion sensor, and a seat switch (not shown).

While FIGS. 1 and 2A through 2B show work area 122 and cab 104 divided into eight and two zones, respectively, any number of zones may be defined. Furthermore, zones may overlap. For example, fourth zone 130 may intersect first zone 124. Having zones that intersect may allow for zonal detection processor 140 to better determinate the operating state of tractor 100 and/or implement 102. For instance, having sixth zone 134 and seventh zone 136 intersect may allow zonal detection processor 140 to better determine the location of operators due to having increased data about the operators.

Figure 3:
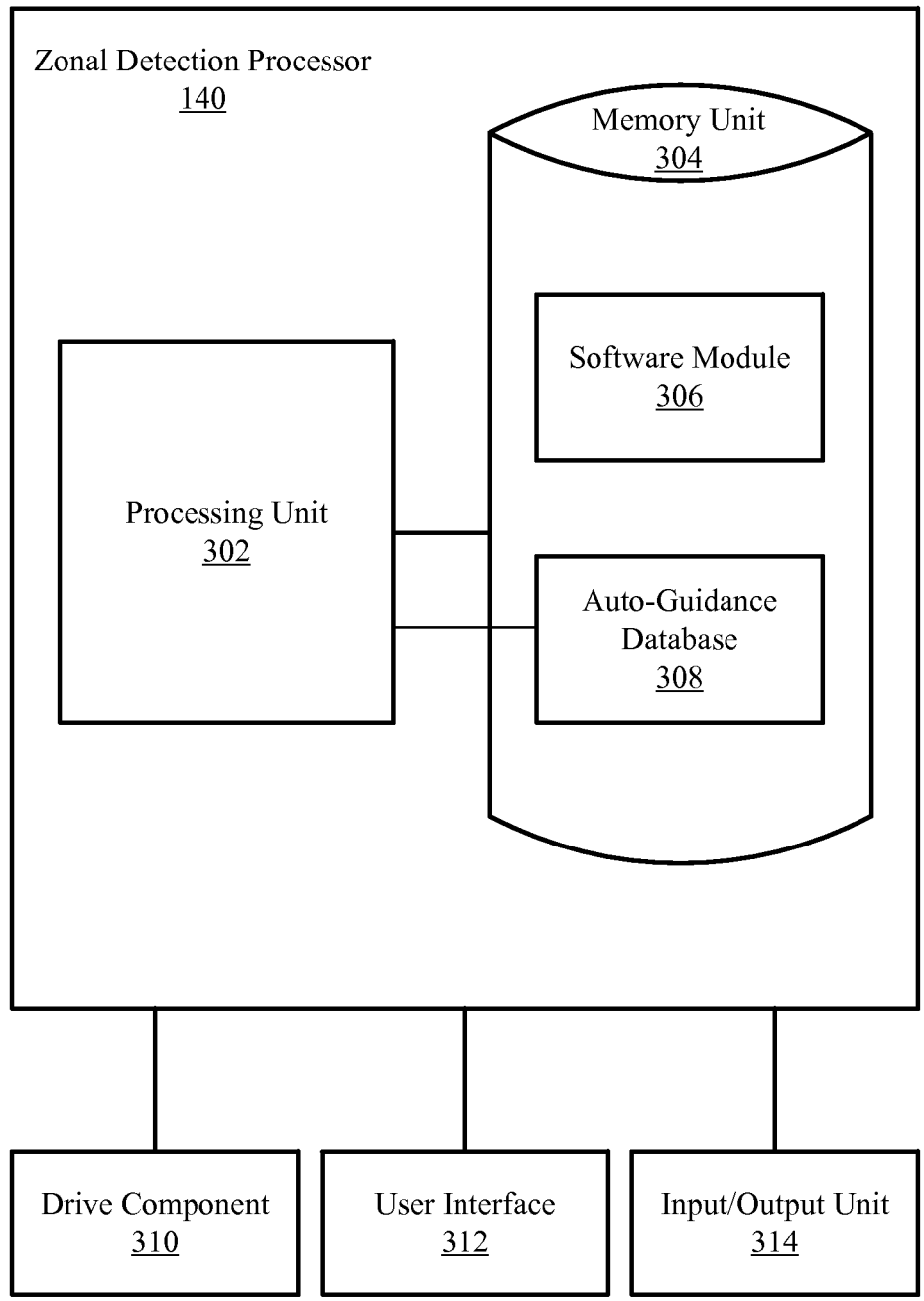
FIG. 3 is a block diagram of a processor.

FIG. 3 shows zonal detection processor 140 in more detail. As shown in FIG. 3, zonal detection processor 140 may include a processing unit 302 and a memory unit 304. Memory unit 304 may include a software module 306 and a database 308. Database 308 may comprise a plurality of data files. Zonal detection processor 140 may also be operatively connected a drive component 310. Drive component 310 may comprise an engine and a steering linkage (not shown) for controlling movement of tractor 100 and/or implement 102. While executing on processing unit 302, software module 306 may perform processes for providing zonal operator detection, including, for example, one or more stages included in method 400 described below with respect to FIG. 4.

In addition, a user interface 312 may be connected to zonal detection processor 140. User interface 312 may allow the operator to input data into zonal detection processor 140. In addition, user interface 312 may allow zonal detection processor 140 to display information to the operator. For example, user interface 312 may display a warning to the operator and allow the operator to acknowledge the warning by pressing a button.

Furthermore, zonal detection processor 140 may include an input/output unit 314. Input/output unit 314 may allow zonal detection processor 140 to receive inputs from the sensors. In addition, input/output unit 314 may allow the zonal detection processor 140 to receive inputs from implements. For example, zonal detection processor 140 may be installed on tractor 100 and may receive inputs from implement 102. The inputs received from implement 102 may allow zonal detection processor 140 to activate and deactivate sensors. For instance, when implement 102 is connected to tractor 100, fourth sensor 112 through eighth sensor 120 may be activated. Furthermore, user interface 312 may allow the operator to deactivate sensors. For example, the operator may press a button on user interface 312 and input/output unit 314 may send a signal to second sensor 108 to deactivate second sensor 108.

Zonal detection processor 140 ("the processor") may be implemented using an onboard engine control unit (ECU), a personal computer, a network computer, a mainframe, or other similar microcomputer-based workstation. The processor may be located on tractor 100, implement 102, or may be in a remote location. For instance, in an agricultural environment, the processor may comprise a computer located at a central location (e.g., a farm's central equipment storage and maintenance facility).

The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, or a wireless fidelity (Wi-Fi) access point. The aforementioned systems and devices are examples and the processor may comprise other systems or devices.

Figure 4:
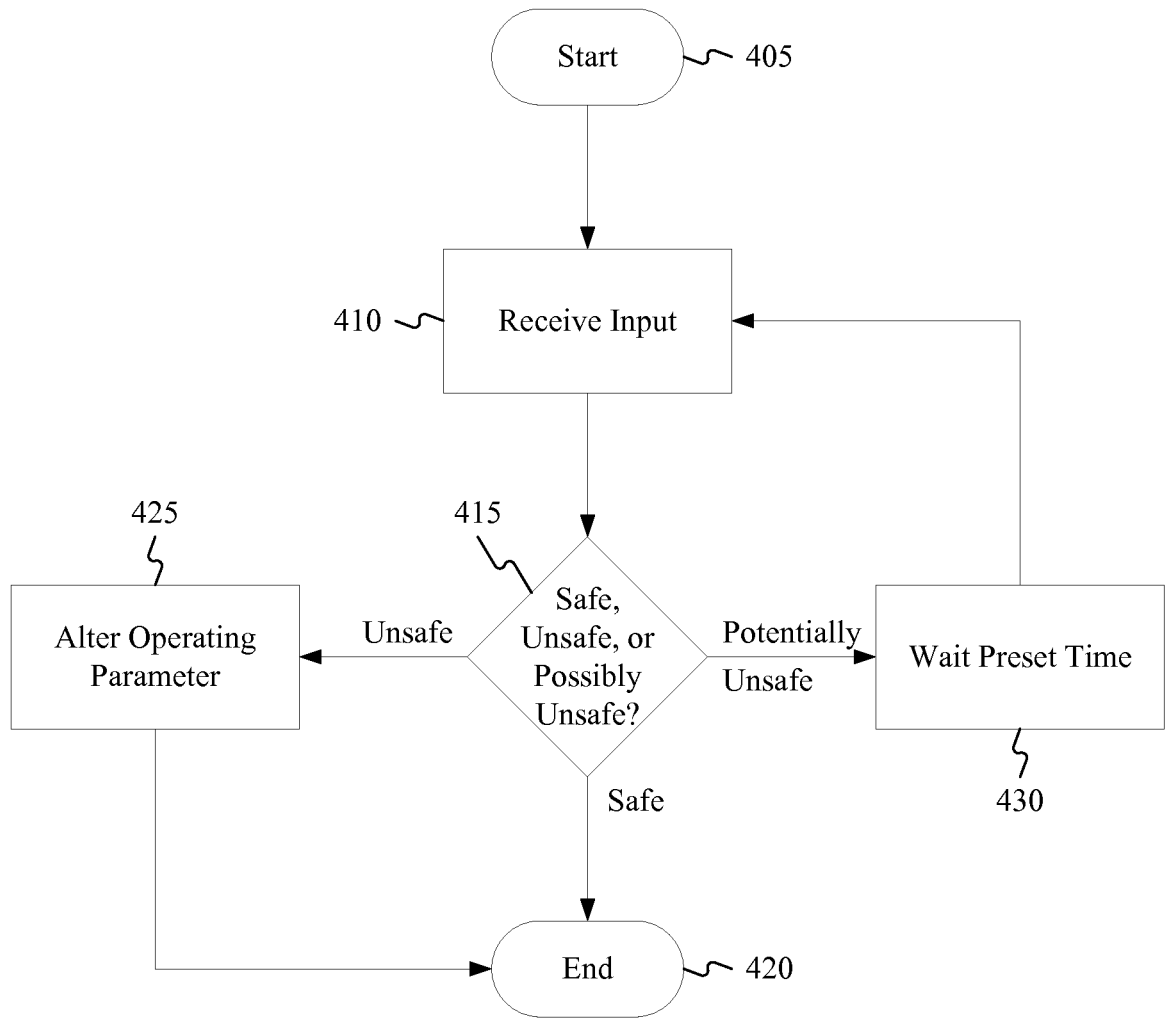
FIG. 4 is a flow chart of a method for providing zonal operator presence detection.

FIG. 4 is a flow chart setting forth the general stages involved in a method 400 for zonal operator presence detection. Method 400 may be implemented using, for example, zonal detection processor 140 as described in more detail above. Ways to implement the stages of method 400 will be described in greater detail below.

Method 400 may begin at starting block 405 and proceed to stage 410 where zonal detection processor 140 may receive an input. For example, an operator may be operating tractor 100 in a field utilizing an auto guidance system. The operator may need to exit cab 104 to clear an obstacle locate in tractor 100's path (e.g., a log located in third zone 128). The operator may leave tractor 100's engine running while he exits cab 104. Third sensor 110 may detect the presence of the operator in third zone 128. Zonal detection processor 140 may receive a sensor output from third sensor 110 indicating the presence of the operator in third zone 128.

In stage 410, zonal detection processor 140 may receive inputs from multiple sensors. For example, in addition to a single operator, multiple operators may be present when tractor 100 is in use. A secondary operator may be assisting a primary operator operating tractor 100 (e.g., driving tractor 100). The secondary operator may approach tractor 100 from the left side of tractor 100 while it is in motion. When the secondary operator enters first zone 124 and fourth zone 130, first sensor 106 and fourth sensor 112 may detect his or her presence. Zonal detection processor 140 may receive inputs from both first sensor 106 and fourth sensor 112. The inputs may provide data to zonal detection processor 140 that allow zonal detection processor 140 to determine an operating state.

From stage 410 where zonal detection processor 140 receives inputs, method 400 may proceed to decision block 415 where zonal detection processor 140 may determine if an operating state of tractor 100 and/or implement 102 is safe, unsafe, or potentially unsafe based on the received inputs. The operating state may be the presence of one or more operators located within work area 122. For example, upon starting tractor 100, the operating state may be tractor 100 at rest with one operator located in cab 104.

The operating state may comprise tractor 100's and/or implement 102's operating configuration at any moment in time and the location of any operators at any moment in time. For example, one operating state may comprise tractor 100 following a wayline though a field while the operator is sitting in cab 104 not touching steering wheel 202 or any other controls. Another operating state may be tractor 100 following the wayline through the field with the operator's hands on steering wheel 202. Yet another operating state may be tractor 100 following the wayline through the field with the operator standing in cab 104 with a secondary operator following behind implement 102 in the seventh zone 136. What constitutes a safe, unsafe, or potentially unsafe operating state may be preprogrammed by tractor 100's and/or implement 102's manufacturer.

If zonal detection processor 140 determines the operating state is safe, method 400 may terminate at termination block 420. If zonal detection processor 140 determines the operating state is unsafe, method 400 may proceed to stage 425 where zonal detection processor 140 stage may adjust an operating parameter of tractor 100 and/or implement 102. For example, in decision block 415, zonal detection processor 140 may determine that the operator is standing in cab 104 and, in stage 425, may retard the engine performance or reduce a maximum speed of tractor 100. In decision block 415, zonal detection processor 140 may determine that a secondary operator is located in eighth zone 138 and in stage 425 may disable tractor 100's hydraulic system in an effort to prevent the operator from inadvertently lowering implement 102 and possibly striking the secondary operator. Furthermore, in decision block 415, zonal detection processor 140 may determine that the operator has exited cab 104 while tractor 100's engine is running and in stage 425 may disable tractor 100's auto guidance system.

If zonal detection processor 140 determines the operating state is potentially unsafe, method 400 may proceed to stage 430 where zonal detection processor 140 may wait a preset time (e.g., 60 seconds), and method 400 may proceed to stage 410 where zonal decision processor 140 may receive inputs from the sensors. After receiving the inputs from the sensors method 400 may proceed to decision block 415 where zonal detection processor may determine that the operating state is still potentially unsafe. If in decision block 415, zonal detection processor 140 determines the operation condition remains potentially unsafe, method 400 may proceed to staged 425 where zonal detection processor 140 may alter the operating parameter. An example of a potentially unsafe operating state may be when the operator is standing in cab 104 when tractor 100's auto guidance system is engaged. This example operating state is not inherently dangerous, but could be dangerous. For instance, when the operator has been out in a field operating tractor 100 for extended periods of time he may standup in cab 104 to stretch. When tractor 100 is traveling in a straight line this may not be a dangerous situations because the operator may not be in danger of being thrown off balance and falling. However, tractor 100 may hit a bump and cause operator to fall and create a potentially unsafe operating state. In addition, tractor 100 may begin to turn a corner and create a potentially unsafe operating state.

For example, in response to determining that the operator is standing (i.e., a potentially unsafe operating state) at decision block 415, zonal detection processor 140 may wait a preset amount of time (e.g., 60 seconds) at stage 430. After waiting the preset time, zonal detection processor 140 may receive inputs from the sensors at stage 410 and determine if the operating state remains unsafe at decision block 415. If the operator is still standing, method 400 may proceed to stage 425 where zonal detection processor 140 may sound an alarm and/or retard tractor 100's engine performance. After altering the operating parameter in stage 425, method 400 may terminate at termination block 420. Method 400 may repeat at regular interval. For example, method 400 may repeat every 5 seconds, 10 seconds, 30 seconds, etc.

Zonal detection processor 140 receiving inputs from the sensors may improve safety be helping to minimize "blind spots" around tractor 100 and implement 104 and may help an operator have better situational awareness. For instance, eighth sensor 120 may detect the presence of an object in eighth zone 138 and send a signal to zonal detection processor 140 that may prevent tractor 100 from being driven in reverse. In addition, at tractor 100's start up, the sensors may scan work area 122 for objects before allowing the operator to move tractor 100.

Using zonal operator detection, onboard systems and functions of tractor 100 and/or implement 102 may be disabled. For example, implement 102 may be in a raised position and sixth sensor 118 may detect the presence of the operator that may be injured by implement 102 if it were to strike him. Sixth sensor 118 may send an output to zonal detection processor 140 that may disable tractor 100's hydraulic system in an effort to prevent the operator from accidently lowering implement 102 and possibly striking another operator. The output may also cause zonal detection processor 140 to send a warning message to the operator. For instance, zonal detection processor 140 may cause an alarm to sound saying "warning, operator located in zone six."

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A method comprising:
    receiving a first sensor output from a first sensor located on an agricultural machine, the sensor output configured to indicate an operating state of the agricultural machine;
    automatically determining, using a computing device, whether an implement is attached to the agricultural machine;
    upon determining that an implement is attached to the agricultural machine, activating a second sensor located on the implement;
    receiving a second sensor output from the second sensor, the second sensor output configured to indicate an operating state of the agricultural machine;
    automatically determining, using a computing device, the operating state of the agricultural machine based on the first sensor output and the second sensor output, the operating state comprising the position of an operator located within a work area of the agricultural machine and the implement, the work area divided into a plurality of zones; and
    automatically adjusting, using a computing device, an operating parameter of the agricultural machine or the implement based on the operating state.

2. The method of claim 1, wherein determining the operating state comprises detecting the operator's location while using the agricultural machine.

3. The method of claim 2, wherein detecting the operator's location comprises detecting a body part's location within at least one of the plurality of zones.

4. The method of claim 1, wherein adjusting the operating parameter comprises retarding an engine's performance, the engine being operatively connected to the agricultural machine.

5. The method of claim 1, wherein adjusting the operating parameter comprises reducing a maximum speed of the agricultural machine.

6. The method of claim 1, wherein adjusting the operating parameter comprises disabling a hydraulic system of the agricultural machine.

7. The method of claim 1, wherein adjusting the operating parameter of the agricultural machine comprises disabling a guidance system.

8. The method of claim 1, wherein adjusting the operating parameter further comprises:
    determining when the operating state is unsafe;
    in response to determining the operating state is unsafe, waiting a preset amount of time;
    after waiting the preset amount of time, determining if the operating state remains unsafe;
    when the operating state remains unsafe, adjusting the operating parameter; and
    when the operating state does not remain unsafe, not adjusting the operating parameter.

9. An agricultural machine comprising:
    a first sensor located on the agricultural machine;
    a memory; and
    a processor coupled to the memory, the processor operative to:
        receive a first output from the first sensor,
        determine whether an implement is attached to the agricultural machine;
        upon determining that an implement is attached to the agricultural machine, activate a second sensor located on the implement;
        receive a second sensor output from the second sensor, the second sensor output configured to indicate an operating state of the agricultural machine;
        determine an operating state of an agricultural machine based on the first sensor output and the second sensor output, the operating state comprising the position of an operator located within a work area of the agricultural machine and the implement, the work area being divided into a plurality of zones, and
        adjust an operating parameter of the agricultural machine or the implement based on the operating state.

10. The apparatus of claim 9, wherein the processor operative to determine the operating state comprises the processor operative to detect the operator's location while within at least one of the plurality of zones.

11. The apparatus of claim 10, wherein the processor operative to detect the operator's location comprises the processor operative to detect a body part's location within the at least one of the plurality of zones.

12. The apparatus of claim 9, wherein the processor operative to adjust the operating parameter comprises the processor operative to retard an engine's performance, the engine being operatively connected to the agricultural machine.

13. The apparatus of claim 9, wherein the processor operative to adjust the operating parameter comprises the processor operative to reduce a maximum speed of the agricultural machine.

14. The apparatus of claim 9, wherein the processor operative to adjust the operating parameter comprises the processor operative to disable a hydraulic system of the agricultural machine.

15. The apparatus of claim 9, wherein the processor operative to adjust the operating parameter comprises the processor operative to disable a guidance system.

16. The apparatus of claim 9, wherein the processor operative to adjust the operating parameter further comprises the processor operative to:
    determine when the operating state is unsafe;
    in response to determining the operating state is unsafe, wait a preset amount of time;
    after waiting the preset amount of time, determine if the operating state remains unsafe;
    when the operating state remains unsafe, adjust the operating parameter; and
    when the operating state does not remain unsafe, not adjust the operating parameter.

* * * * *